US012424792B2

(12) United States Patent
Tang

(10) Patent No.: US 12,424,792 B2
(45) Date of Patent: Sep. 23, 2025

(54) ELECTRICAL CONNECTOR

(71) Applicant: Likui Tang, Dongguan (CN)

(72) Inventor: Likui Tang, Dongguan (CN)

( * ) Notice: Subject to any disclaimer, the term of this patent is extended or adjusted under 35 U.S.C. 154(b) by 421 days.

(21) Appl. No.: 17/980,580

(22) Filed: Nov. 4, 2022

(65) Prior Publication Data

US 2023/0052461 A1 Feb. 16, 2023

(51) Int. Cl.
*H01R 13/639* (2006.01)
*H01R 13/502* (2006.01)

(52) U.S. Cl.
CPC ......... *H01R 13/639* (2013.01); *H01R 13/502* (2013.01)

(58) Field of Classification Search
CPC . H01R 13/639; H01R 13/502; H01R 13/6392
See application file for complete search history.

(56) References Cited

U.S. PATENT DOCUMENTS

2019/0173231 A1* 6/2019 Dobler ............... H01R 13/6275
2019/0273344 A1* 9/2019 Chapel ............... H01R 13/6392
2020/0303862 A1* 9/2020 Pachoud ............ H01R 13/6271
2022/0181817 A1 6/2022 Chen et al.
2022/0209465 A1 6/2022 Hsieh
2022/0216634 A1 7/2022 Liao
2022/0368059 A1* 11/2022 Pachoud .............. H01R 13/639
2023/0052461 A1* 2/2023 Tang .................... H01R 13/502
2024/0178614 A1* 5/2024 Wu ...................... H01R 13/635

FOREIGN PATENT DOCUMENTS

CN 111478120 A * 7/2020

* cited by examiner

*Primary Examiner* — Abdullah A Riyami
*Assistant Examiner* — Nader J Alhawamdeh
(74) *Attorney, Agent, or Firm* — Hemisphere Law, PLLC; Zhigang Ma

(57) ABSTRACT

The present disclosure provides an electrical connector, including a housing, a locking mechanism, and an actuating component. The housing has a wire outlet side; a wire connected to an electrical connection point is led out of the housing from the wire outlet side; the locking mechanism may move to a locked position or a released position relative to the housing; at the locked position, the housing is fixed relative to another connector; and at the released position, the housing may be separated from the another connector.

12 Claims, 10 Drawing Sheets

ELECTRICAL CONNECTOR

TECHNICAL FIELD

The present disclosure relates to the technical field of connectors, in particular, to an electrical connector capable of reducing a handle movement space.

BACKGROUND

Electric equipment is powered on when an electrical connector is connected to another connector. The electric equipment is powered off when the electrical connector is disconnected from another connector. In some special places, it is necessary to keep a stable electrical connection state when the electrical connector is connected to another connector. Therefore, a locking structure will be arranged on the electrical connector to lock the electrical connector with another connector.

The locking structure can move when a handle drives a rotating shaft to rotate. The handle is similar to a lever, so that a force applied by a user to lock or release the electrical connector can be reduced.

When there are many sets of electrical equipment, multiple other connectors will be arranged on a patch panel for plugging multiple electrical connectors. However, the handle will protrude excessively from a space between the electrical connector and an adjacent electrical connector during rotation, so an enough space needs to be reserved between the two electrical connectors for the handle to move. Therefore, the electrical connectors will not be arranged closely enough, and the patch panel occupies a relatively large space.

SUMMARY

In view of this, in order to solve one of the technical problems in the prior art to a certain extent, it is necessary to provide an electrical connector to reduce the movement of a handle between two electrical connectors.

One implementation of the present disclosure provides an electrical connector used for being electrically connected to another matched connector. The electrical connector includes a housing, a locking mechanism, and an actuating component, wherein at least one electrical connection point electrically connected to the another connector is received in the housing; the housing has a wire outlet side; a wire connected to the electrical connection point is led out of the housing from the wire outlet side;

the locking mechanism moves to a locked position or a released position relative to the housing; at the locked position, the housing is fixed relative to another connector; at the released position, the housing may be separated from the another connector;

the actuating component comprises a rotating shaft and a handle; the handle is connected to the rotating shaft to drive the rotating shaft to rotate; the rotating shaft is provided with an actuating structure; the actuating structure acts on the locking mechanism such that the locking mechanism is at the locked position or the released position; and a pull end of the handle is kept on the wire outlet side in the movement process.

According to the electrical connector provided in this implementation, the handle drives the rotating shaft to rotate. In the rotation process of the rotating shaft, the actuating structure acts on the locking mechanism to make the locking mechanism at the locked position or the released position. A wire is led out of the wire outlet side, and the wire needs to occupy the space of the wire outlet side. Furthermore, the electrical connector will not be arranged at intervals along the wire outlet side. Therefore, the pull end of the handle is kept at the wire outlet side in the moving process. The handle and the wire are arranged on the same side and occupy the space of the wire outlet side together. The handle will not move to a space between two electrical connectors, so that the two electrical connectors can be closer.

Another implementation of the present disclosure provides an electrical connector used for being electrically connected to another matched connector. The electrical connector includes a flat housing, a locking mechanism, and an actuating component, wherein at least one electrical connection point electrically connected to another connector is received in the housing;

the locking mechanism moves to a locked position or a released position relative to the housing; at the locked position, the housing is fixed relative to another connector; at the released position, the housing is able to be separated from the another connector;

the actuating component comprises a rotating shaft and a handle; the handle is connected to the rotating shaft to drive the rotating shaft to rotate; a surface swept by the rotation of the handle is parallel to a virtual flat extending surface of the housing; the rotating shaft has an actuating structure; and the actuating structure is used for making the locking mechanism at the locked position or the released position.

The electrical connector provided in this implementation is of a flat shape, and a plurality of electrical connectors will be arranged at intervals in a direction perpendicular to the flat direction. The handle drives the rotating shaft to rotate. In the rotation process of the rotating shaft, the actuating structure acts on the locking mechanism to make the locking mechanism at the locked position or the released position. The surface swept by the rotation the handle is parallel to the virtual flat extending surface of the housing, so that the handle will not move to a space between two electrical connectors, so that the two electrical connectors can be closer.

Figure 1:
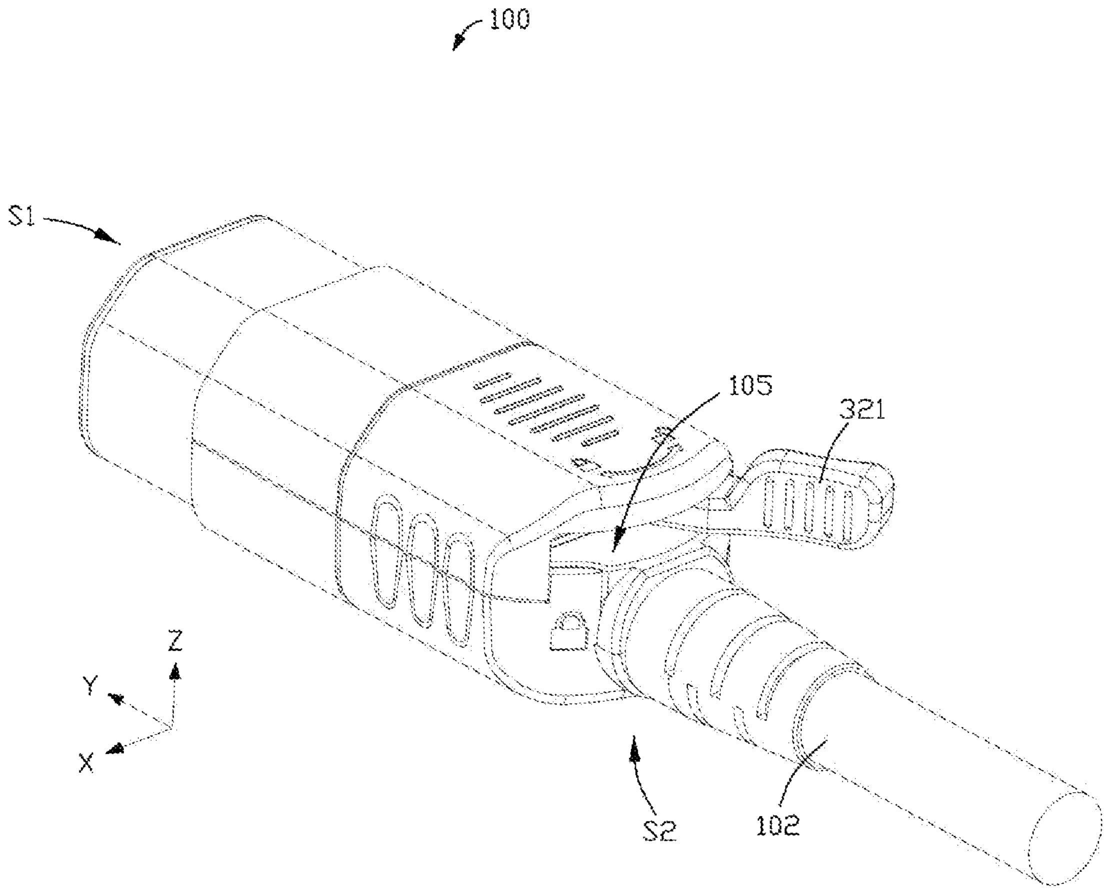
FIG. 1 is a schematic structural diagram of an electrical connector of one specific embodiment of the present disclosure from a first viewing angle.

The present disclosure will be further described in the following specific implementation modes with reference to the above accompanying drawings.

DETAILED DESCRIPTION OF THE EMBODIMENTS

The technical solutions in the embodiments of the present disclosure will be described clearly and completely below in combination with the accompanying drawings of the embodiments of the present disclosure. Apparently, the described embodiments are only part of the embodiments of the present disclosure, not all embodiments. Based on the embodiments in the present disclosure, all other embodiments obtained by those of ordinary skill in the art without creative efforts shall fall within the protection scope of the present disclosure. It can be understood that the drawings are only provided for reference and illustration, and are not used to limit the present disclosure. The connection relationships shown in the drawings are only for the convenience of clear description, and do not limit the connection methods.

FIG. 1 is a schematic structural diagram of an electrical connector 100 of one embodiment of the present disclosure. For the description of specific embodiments of the present disclosure, X, Y and Z shown in FIG. 1 are used to represent the horizontal, longitudinal and vertical directions respectively without limitation.

An electrical connector 100 of the embodiments of the present disclosure is a male plug, which can be connected to another connector 200 serving as a female plug to achieve electrical conduction. It can be understood that in other implementations, the electrical connector 100 may also be a female socket, while a matched connector is a male plug.

Figure 3:
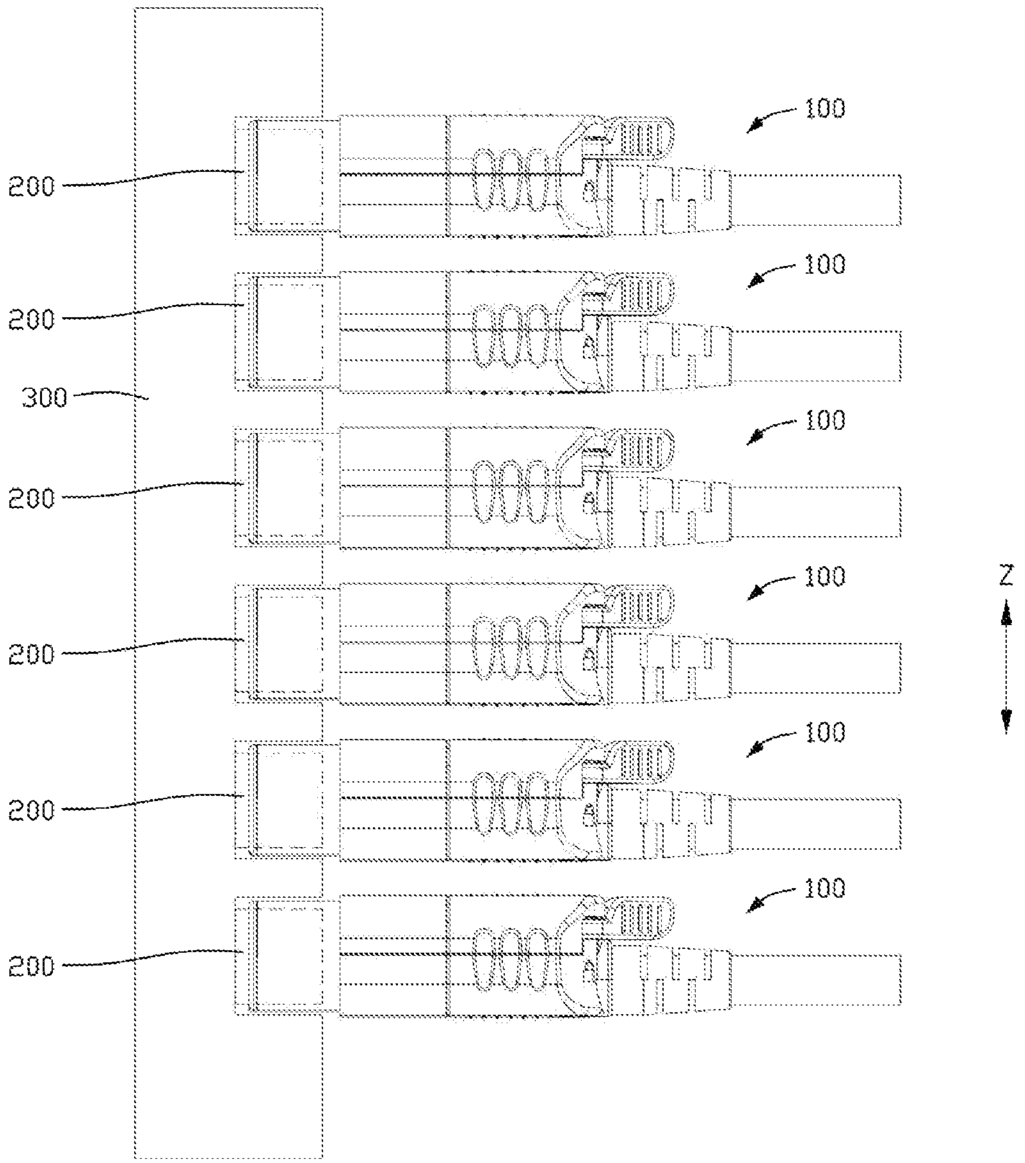
FIG. 3 is a schematic structural diagram of an electrical connector of one specific implementation of the present disclosure when the electrical connector is arranged and plugged on a patch panel.

The electrical connector 100 may be connected to electrical equipment, while the other connector 200 may be connected to a power supply. As shown in FIG. 3, a plurality of connectors 200 can be arranged on a patch panel 300 at intervals. When the electrical connectors 100 are correspondingly plugged to the patch panel 300, the plurality of electrical connectors 100 may be arranged at intervals along a vertical direction, and there is a certain space between two adjacent electrical connectors 100.

Figure 2:
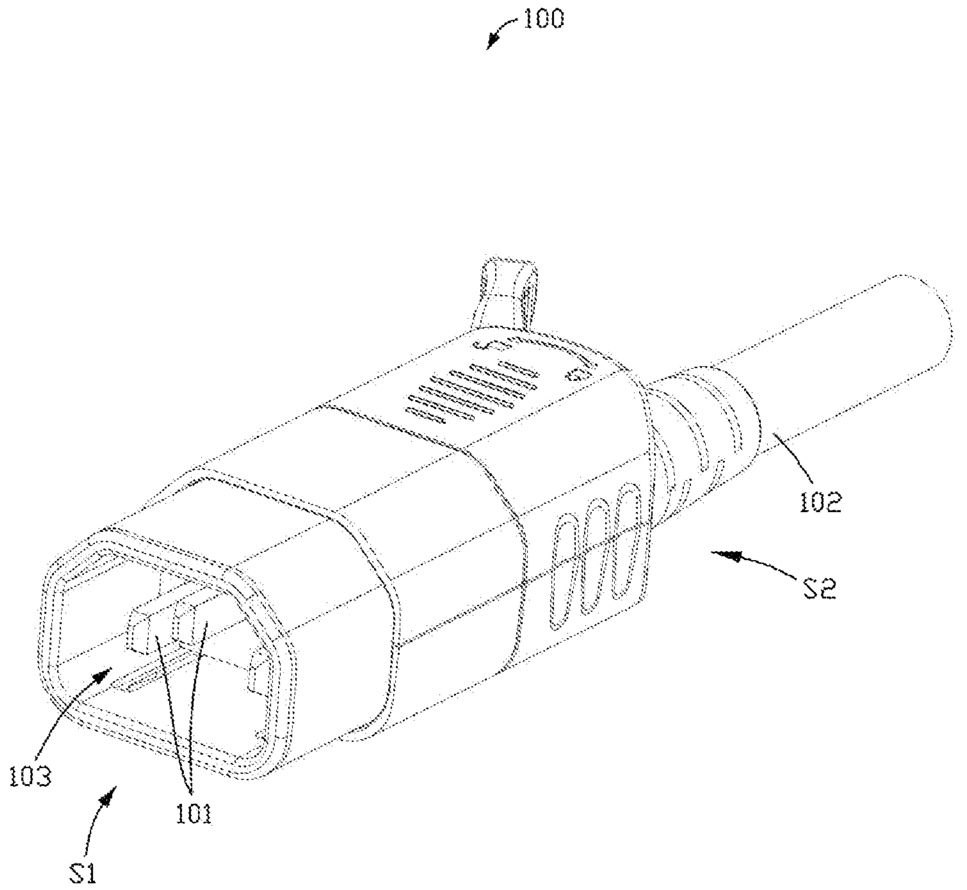
FIG. 2 is a schematic structural diagram of an electrical connector of one specific embodiment of the present disclosure from a second viewing angle.

Continuing to refer to FIG. 1 and FIG. 2, the electrical connector 100 includes a plugging side S1 and a wire outlet side S2. The plugging side S1 is located at a longitudinal front end, and the wire outlet side S2 is located at a longitudinal rear end. The plugging side S1 is an end plugged with the other connector 200, and a wire 102 connected to an electrical connection point 101 inside the electrical connector 100 is led out of the wire outlet side S2.

Figure 4:
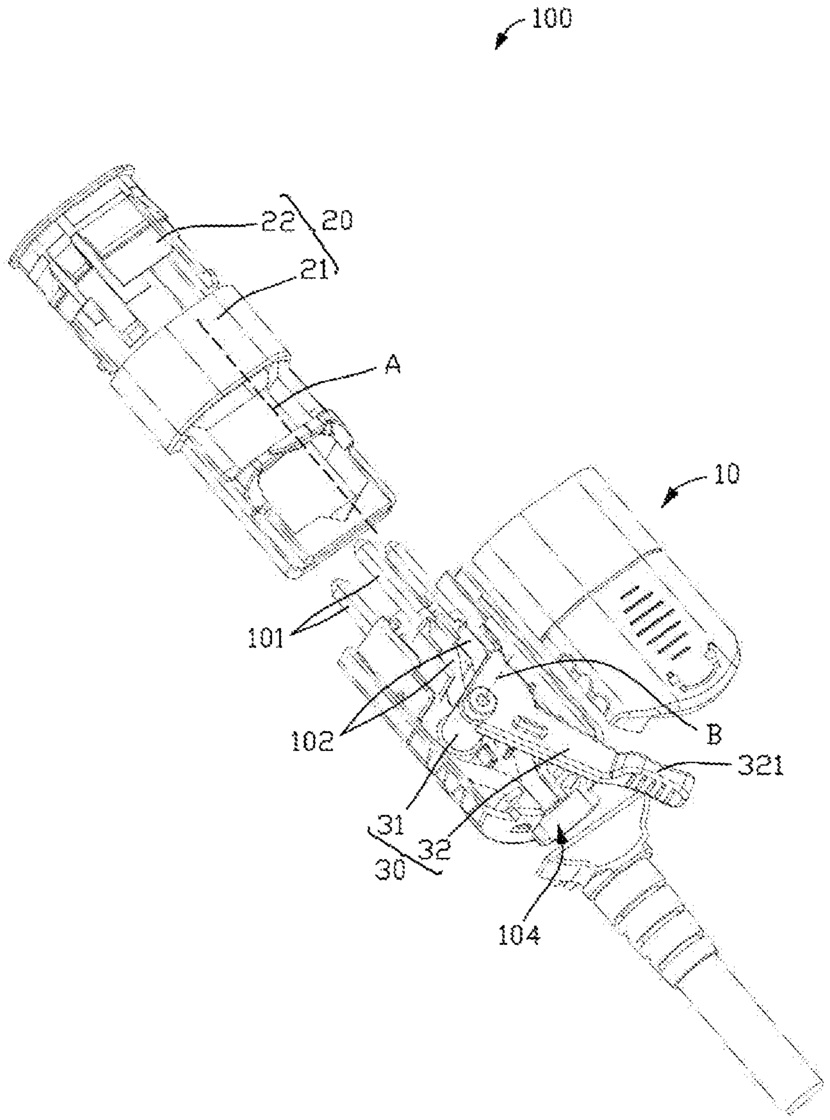
FIG. 4 is an exploded diagram of an electrical connector of one specific embodiment of the present disclosure.

Referring to FIG. 4, the electrical connector 100 includes a housing 10, a locking mechanism 20, and an actuating component 30.

The housing 10 may be of a flat shape, which is vertically flattened and extends on a virtual plane formed in transverse and longitudinal directions, so that the electrical connector 100 is finally roughly flat. A front end of the housing 10 is provided with an opening 103. The electrical connection point 101 is fixed in the housing 10. A rear end of the housing 10 is the wire outlet side S2. The rear end of the housing 10 is provided with a lead port 104, and the wire 102 is connected to the electrical connection point 101 and extends out of the housing 10 from the lead port 104.

The actuating component 30 is used for causing the locking mechanism 20 to move to a locked position or a released position.

In this implementation, the locking mechanism 20 may include a push member 21 and a locking plate 22. The locking plate 22 is connected with the housing 10. The push member 21 has a virtual longitudinal central line A, and the push member 21 may move longitudinally relative to the housing 10. The locking plate 22 may be extruded to deform. The push member 21 may extrude the locking plate 22 to deform and press a surface of the other connector 200 in a longitudinal backward movement process, so as to achieve an effect of locking the electrical connector 100 and the other connector 200. After the push member 21 moves forward longitudinally and releases the locking plate 22, the locking plate 22 no longer presses the surface of the other connector 200, so that the electrical connector 100 may be released and separated from the other connector 200.

In other implementations, the locking mechanism 20 may only include a push member 21. A plugging piece is formed on the push member 21. When the push member 21 moves longitudinally forward relative to the housing 10, the plugging piece is inserted into the space between the electrical connector 100 and the other connector 200. The plugging piece increases a relative movement friction and extrusion force between the electrical connector 100 and the other connector 200, thus achieving a locking effect. When the push member 21 moves longitudinally backward relative to the housing 10, when the inserting piece is withdrawn from the space between the electrical connector 100 and the other connector 200 to reduce the friction and extrusion force caused by the relative movement of the electrical connector 100 and the other connector 200, the electrical connector 100 may be released and separated from the other connector 200.

The actuating component 30 drives the locking mechanism 20 to move. Specifically, the actuating component 30 includes a rotating shaft 31 and a handle 32. The rotating shaft 31 is arranged in the housing 10 and connected with the housing 10. The rotating shaft 31 is arranged vertically. The handle 32 is connected with the rotating shaft 31 to drive the rotating shaft 31 to rotate relative to the housing 10. The handle 32 may be integrated with the rotating shaft 31, and a virtual axis of the handle 32 is the same as a virtual axis B of the rotating shaft 31.

Figure 5:
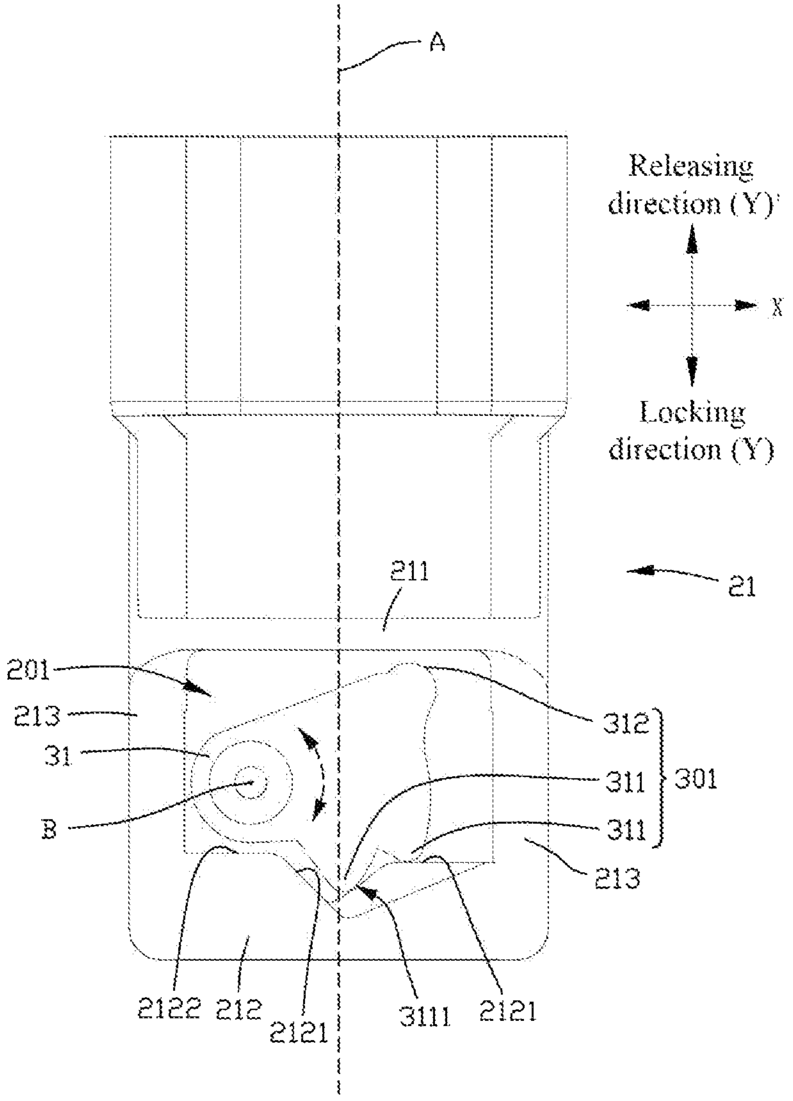
FIG. 5 is a simplified schematic diagram of cooperation between a push member and a rotating shaft of one specific implementation of the present disclosure.

Referring to FIG. 5, FIG. 5 is a simplified schematic diagram where only the push member 21 and the rotating shaft 31 are retained. The rotating shaft 31 extends radially out of the actuating structure 301. During the rotation of the rotating shaft 31, the actuating structure 301 acts on the push member 21, so that the locking mechanism 20 is at the locked position or the released position.

Returning to FIG. 1, the wire outlet side S2 of the housing 10 has another movement port 105, and a pull end 321 of the handle 32 extends out of the housing 10 from the movement port 105 to the wire outlet side S2. The handle 32 moves in the movement port 105 during the rotation, and the pull end 321 of the handle 32 is always kept at the wire outlet side S2 during the movement.

As the wire outlet side S2 is used for leading out the wire 102, and the wire 102 itself occupies the space of the wire outlet side S2. Therefore, the handle 32 is arranged on the same side as the wire 102, and the handle 32 and the wire 102 occupy the space of the wire outlet side S2. The handle 32 moves at the wire outlet side S2, and the handle 32 will not move into the space between two electrical connectors 100, so that the two electrical connectors 100 can be closer when they are arranged at an interval in the vertical and/or transverse direction. More electrical connectors 100 can be arranged on the patch panel 300 with the same area. In addition, the movement of the handle 32 will not be hindered by other electrical connectors 100, and a user can operate the handle 32 more easily.

Further, continuing to refer to FIG. 5, a longitudinal rear end of the push member 21 has an accommodating space 201. The rotating shaft 31 is located in the accommodating space 201. The push member 21 located in front of the rotating shaft 31 is provided with a front plate 211. The push member 21 located behind the rotating shaft 31 is provided with a rear plate 212. The front plate 211 and the rear plate 212 are connected through a longitudinal connection plate 213. The longitudinal connection plate 213 is clung to a lateral side edge of the housing 10.

The actuating structure 301 may rotate clockwise or anticlockwise with the rotating shaft 31. In a top view, the actuating structure 301 rotates anticlockwise to push the front plate 211 to make the push member 21 move forward longitudinally. The actuating structure 301 rotates clockwise to push the rear plate 212 to make the push member 21 move backward longitudinally.

An internal transverse width of the electrical connector 100 is limited, and a radius of the actuating structure 301 will be smaller due to a space restriction. The rotating shaft 31 rotates a unit angle to make the push member 21 have a smaller longitudinal movement distance, which ultimately makes the locking mechanism 20 have a lower locking force, so that it is easily caused that the electrical connector 100 is released from the other connector 200, causing a potential safety hazard. Especially when the electrical connector 100 is of a flat shape, a vertical height of the electrical connector 100 is more restrictive. If the rotating shaft 31 is transversely arranged, it will not only lead to the problem that the handle 32 moves to the space between the two electrical connectors 100, but also further reduce the radius of the actuating structure 301.

To this end, in this implementation, the virtual axis B of the rotating shaft 31 is located on a transverse side of the virtual longitudinal central line A of the push member 21, that is, the virtual axis B is not on the virtual longitudinal central line A. As shown in FIG. 5, the rotating shaft 31 is located on a left transverse side. The rotating shaft 31 may be close to the longitudinal connection plate 213, leaving only a narrow clearance from the longitudinal connection plate 213. The actuating structure 301 extends to the other side of the virtual longitudinal central line A. In this way, the radius of the actuating structure 301 can be increased more effectively. The rotating shaft 31 rotates at a unit angle, so that the actuating structure 301 causes the push member 21 to have a larger longitudinal movement distance, which effectively makes use of the limited space inside the housing 10.

The actuating structure 301 includes a plurality of first bulges 311 and one second bulge 312. The second bulge 312 acts on the push member 21 to move (longitudinally forward) towards the released position. In the top view, when the rotating shaft 31 rotates anticlockwise, the second bulge 312 acts on the front plate 211 to make the push member 21 move forward longitudinally.

Figure 6:
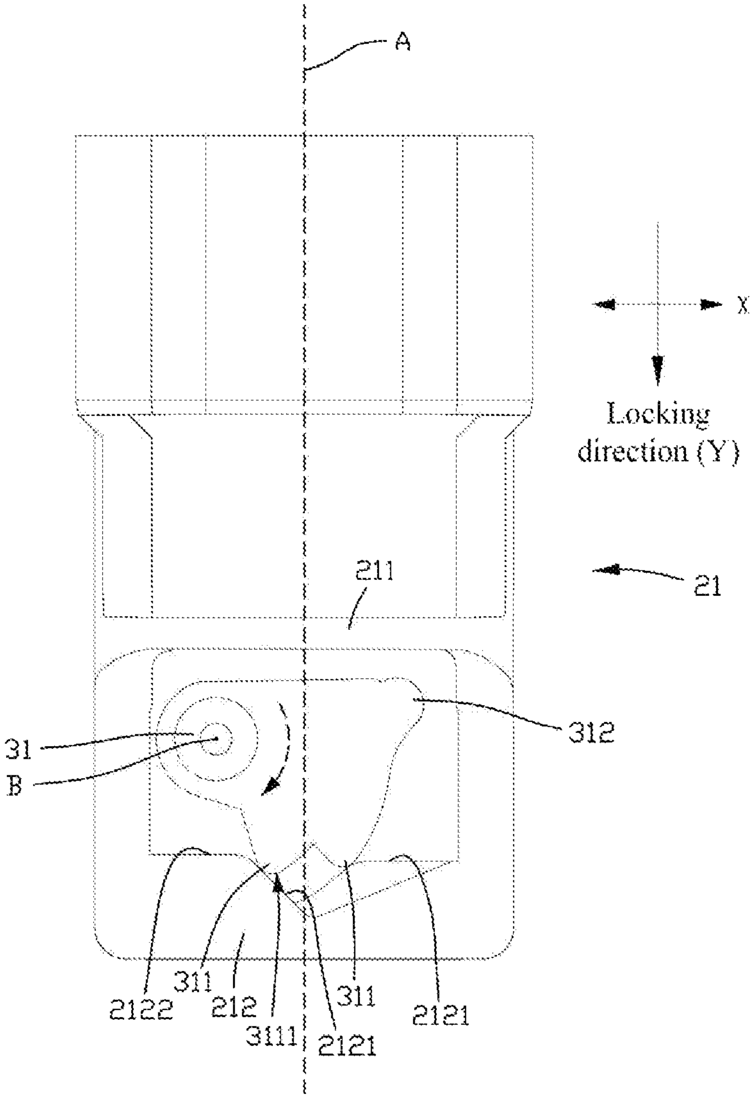
FIG. 6 is a simplified schematic diagram after the push member in FIG. 5 moves a distance backward along a longitudinal direction.
Figure 7:
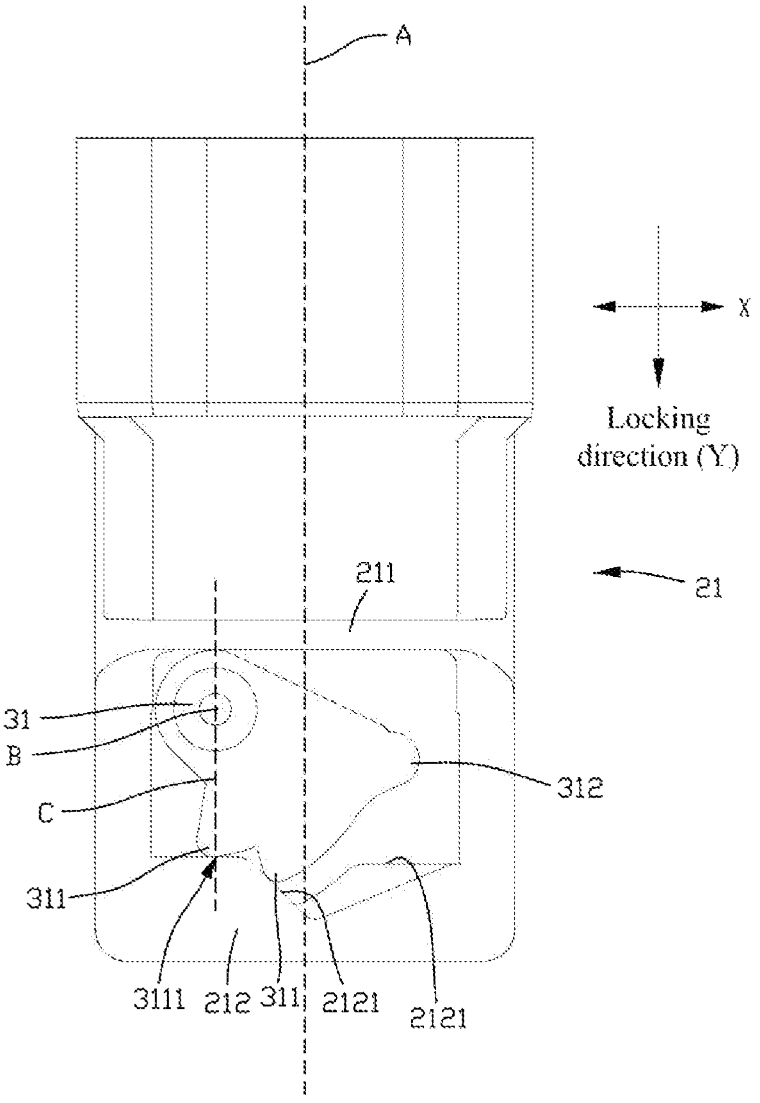
FIG. 7 is a simplified schematic diagram after the push member in FIG. 6 moves a distance backward again along a longitudinal direction.

Referring to FIG. 6 and FIG. 7, the plurality of first bulges 311 respectively make the push member 21 to move (longitudinally backward) to the locked position. In a clockwise direction, the first bulges 311 are arranged forward on the rotating shaft 31 at intervals in sequence. During the clockwise rotation of the rotating shaft 31, the first bulges 311 push the push member 21 to move (longitudinally backward) to the locked position in turn.

In a specific implementation example, the actuating structure 301 includes two first bulges 311. In the process of pushing the push member 21 to move longitudinally backward, the first bulge 311 at the back first acts on the rear plate 212 to make the push member 21 move a certain distance, for example 2.5 mm, longitudinally backward. The first bulge 311 at the front takes over and continues to act on the rear plate 212 to make the push member 21 move a certain distance, for example 1.5 mm, longitudinally backward.

In the clockwise direction, the foremost first bulge 311 has a holding surface 3111. When the foremost first bulge 311 acts on the push member 21 to make the push member to move longitudinally backward to a limit position, the rotating shaft 31 continues to rotate to keep the holding surface 3111 in contact with the rear plate 212. At this time, the push member 21 will be kept at the locked position.

Figure 8:
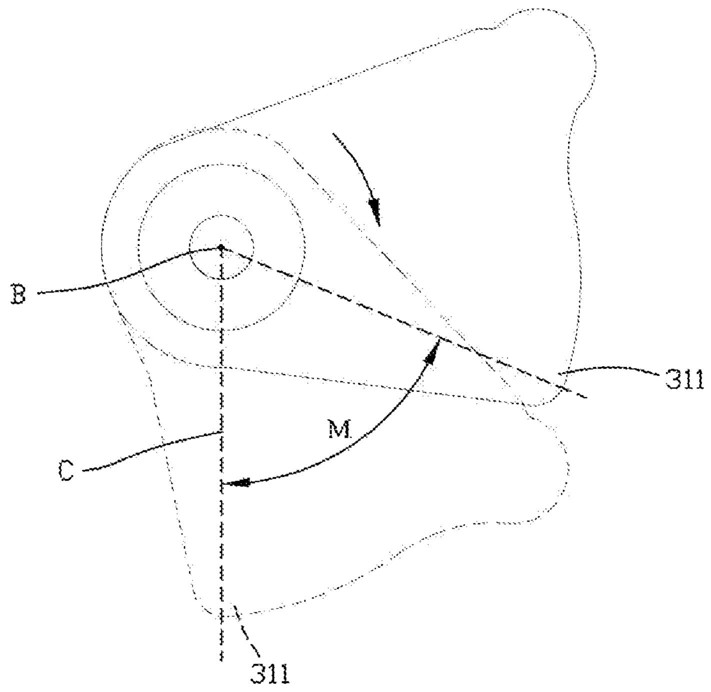
FIG. 8 is a schematic diagram of a rotation angle required by a rotating shaft only provided with one first bulge to reach an optimum state.
Figure 9:
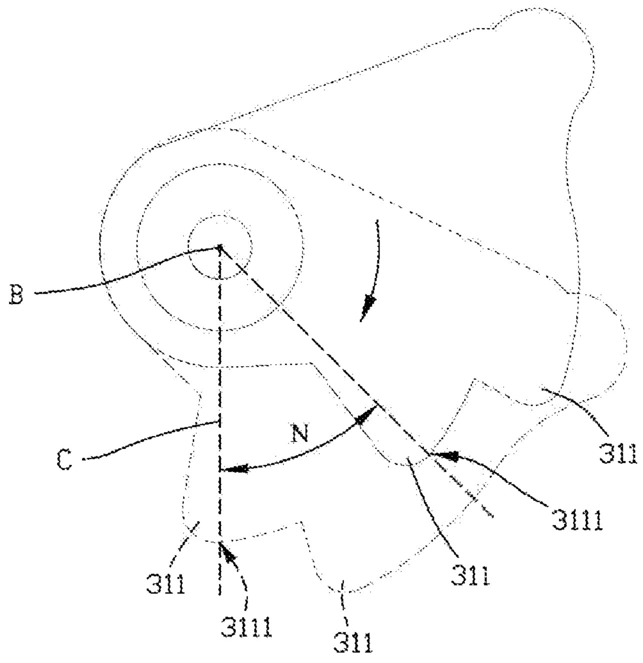
FIG. 9 is a schematic diagram of a rotation angle required by a rotating shaft provided with two first bulges to reach an optimum state.

The reason for this setting is as follows: When the push member 21 is kept at the locked position, if contact points or contact surfaces of contact between the holding surface 3111 and the rear plate 212 and the virtual axis B of the rotating shaft 31 are basically aligned at the front and back along the longitudinal direction (may be on the same longitudinal line C). At this time, the holding surface 3111 is the most stable when it is kept in contact with the rear plate 212, and the handle 32 does not easily rotate clockwise under a low external force, that is, the locking effect is the best. As shown in FIG. 8, if one first bulge 311 is arranged, in order to make the first bulge 311 reach the above state, the first bulge 311 needs to rotate angle M clockwise, and the handle 32 also needs to rotate angle M. As shown in this implementation, in combination with FIG. 9, if a plurality of first bulges 311 are arranged, after the rotating shaft 31 clockwise rotates angle N (it can be seen that N is less than M), the holding surface 3111 of the foremost first bulge 311 and the virtual axis B of the rotating shaft 31 are basically aligned with at the front and back along the longitudinal direction. Therefore, the rotation angle of the handle 32 can be effectively reduced by arranging a plurality of first bulges 311, thereby narrowing the movement range of the pull end 321 of the handle 32 and further narrowing the movement space of the handle 32. In addition, a width of the wire outlet side S2 of the electrical connector 100 is small. By narrowing the movement space of the handle 32, it is also conducive to keeping the pull end 321 of the handle 32 at the wire outlet side S2 while ensuring that the locking mechanism 20 is locked during the movement of the pull end 321.

In the clockwise rotation direction, a radial distance between the front first bulge 311 and the virtual axis B is shorter than a radial distance between the rear first bulge 311 and the virtual axis B.

As shown in FIG. 5, the rear plate 212 is provided with a plurality of first abutting surfaces 2121 and one second abutting surface 2122. A plurality of first abutting surfaces 2121 are used for abutting against the corresponding first bulges 311. The first abutting surface 2121 for abutting against the foremost first bulge 311 is connected with the second abutting surface 2122. The second abutting surface 2122 is another holding surface arranged on the rear plate 212 for abutting against the holding surface 3111.

The first abutting surface 2121 for abutting against the foremost first bulge 311 is an inclined surface, and the inclined surface 2121 is inclined in a manner of being gradually away from the virtual axis B longitudinally backward. When the corresponding first bulges 311 abut against the inclined surfaces 2121, the inclined surfaces 2121 are relative to a plane. On the premise that the first bulges 311 rotate the same angle, a longitudinal backward movement distance of the push member 21 caused by the fact that the first bulges 311 act on the inclined surfaces 2121 is greater than a distance caused by the fact that the first bulges 311 act on the plane. That is, the inclined surfaces 2121 are conductive to prolonging the longitudinal backward movement distance of the push member 21.

As shown in FIG. 7, when the rotating shaft 31 rotates to the locked position, the inclined surface 2121 can also be used as a stop surface to prevent another first bulge 311 from continuing to rotate. At this time, in the clockwise rotation direction, the contact points or contact surfaces of the holding surface 3111 and the rear plate 212 that are kept in contact can cross the longitudinal line C passing through the virtual axis B of the rotating shaft 31. When the push member 21 intends to move longitudinally forward (a releasing direction), an acting force of the other first bulge 311 on the inclined surface 2121, an acting force of the holding surface 3111 on the rear plate 212, and a longitudinal forward acting force (in the releasing direction) of the push member 21 form a triangular structure. The acting force of the holding surface 3111 on the rear plate 212 restrains the push member 21 from moving longitudinally forward (the releasing direction) under the action of the other first bulge 311 and the inclined surface 2121, which is conductive to keeping the push member 21 at the locked position.

Figure 10:
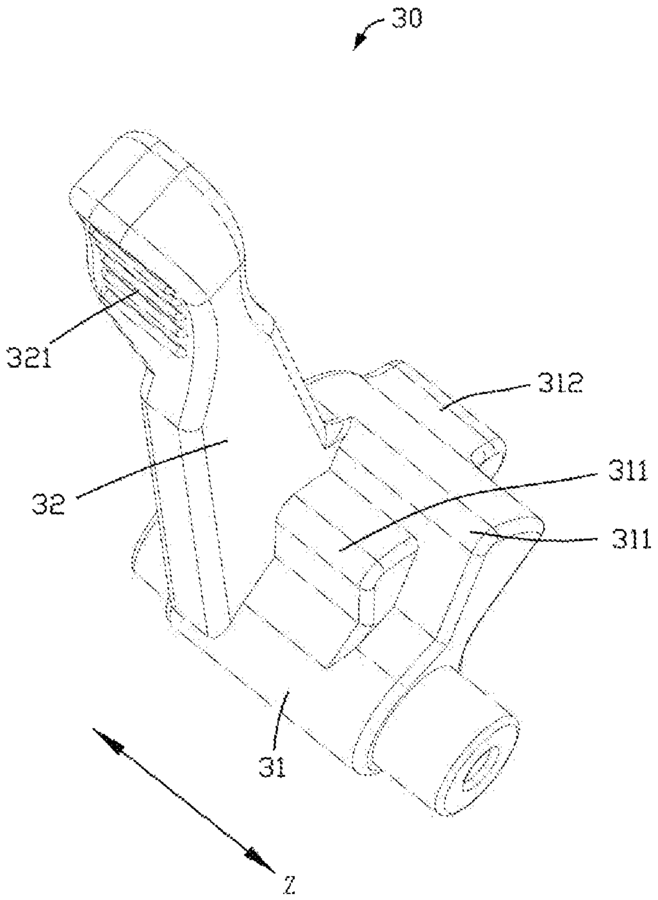
FIG. 10 is a schematic structural diagram of an actuating component of one specific implementation mode of the present disclosure.

As shown in FIG. 10, the plurality of first bulges 311 may be distributed at different axial positions of the rotating shaft 31. The front first bulges 311 are located at a vertical upper layer, and the rear first bulges 311 are located at a vertical lower layer. Correspondingly, a plurality of first abutting surfaces 2121 correspond to different vertical positions, which can avoid the rear plate 212 from hindering the movement of the first bulges 311.

In another embodiment, the housing 10 of the electrical connector 100 is of a flat shape, which is vertically flattened and extends on a virtual plane formed in transverse and longitudinal directions, so that the electrical connector 100 is finally flat. The rotating shaft 31 is perpendicular to a virtual flat extending surface of the housing 10. A surface swept by the rotation of the handle 32 is parallel to the virtual flat extending surface of the housing 10. The pull end 321 of the handle 32 may be located on the left side, right side or rear side of the housing 10. In the rotation process of the handle 32, the handle 32 will not move to a space between two electrical connectors 100 arranged at an interval in a direction perpendicular to the flat extending surface, so that the two electrical connectors 100 can be closer.

The above descriptions are only the preferred embodiments of the present disclosure, and are not intended to limit the present disclosure. Any modifications, equivalent replacements and improvements that are made within the spirit and principle of the present disclosure shall fall within the protection scope of the present disclosure.

What is claimed is:

1. An electrical connector, used for being electrically connected to another matched connector, the electrical connector comprising a housing, a locking mechanism, and an actuating component, wherein at least one electrical connection point electrically connected to the another connector is received in the housing; the housing has a wire outlet side; a wire connected to the electrical connection point is led out of the housing from the wire outlet side;

the locking mechanism moves to a locked position or a released position relative to the housing; at the locked position, the housing is fixed relative to another connector; at the released position, the housing is able to be separated from the another connector;

the actuating component comprises a rotating shaft and a handle; the handle is connected to the rotating shaft to drive the rotating shaft to rotate; the rotating shaft is provided with an actuating structure; the actuating structure acts on the locking mechanism such that the locking mechanism is at the locked position or the released position; and a pull end of the handle is kept on the wire outlet side in the movement process;

wherein the locking mechanism comprises a push member; the push member is pushed by the actuating structure to move along a front-back longitudinal direction; the rotating shaft is vertically arranged; a virtual axis of the rotating shaft is located on one transverse side of a virtual longitudinal central line of the push member; and the actuating structure extends towards the other side direction of the virtual longitudinal central line of the push member;

wherein the push member comprises a front plate, a rear plate, and a longitudinal connection plate; the front plate and the rear plate are connected through the longitudinal connection plate; the push member pushes, through the actuating structure, the front plate to move forward or the rear plate to move backward; and the rotating shaft is close to the longitudinal connection plate.

2. The electrical connector according to claim 1, wherein the actuating structure comprises a plurality of first bulges; the first bulges are arranged forward at intervals in sequence along a preset rotation direction; when the rotating shaft rotates towards the preset rotation direction, the plurality of first bulges respectively push the push member such that the push member moves towards the locked position; the first bulge at the foremost end of the preset direction has a holding surface; and the holding surface is kept in contact with the push member to keep the push member at the locked position.

3. The electrical connector according to claim 2, wherein a radial distance between the front first bulge and the virtual axis is shorter than a radial distance between the rear first bulge and the virtual axis along the preset rotation direction.

4. The electrical connector according to claim 2, wherein the push member comprises a plurality of first abutting surfaces and one second abutting surface; the plurality of first abutting surfaces are used for abutting against the corresponding first bulges respectively; the first abutting surface abutting against the foremost first bulge is connected to the second abutting surface; and the second abutting surface is kept abutting against the holding surface.

5. The electrical connector according to claim 4, wherein the first abutting surface abutting against the foremost first bulge is an inclined surface; and the inclined surface is inclined in a manner of being gradually away from the virtual axis towards the locked position.

6. The electrical connector according to claim 5, wherein the inclined surface is also used as a stop surface; when the push member is at the locked position, the inclined surface can stop another first bulge from continuously rotating; and when the holding surface is kept in contact with the push member to keep the push member at the locked position, contact points or contact surfaces of the holding surface and the push member cross, in the preset rotation direction, a longitudinal line which passes through the virtual axis of the rotating shaft.

7. The electrical connector according to claim 2, wherein the holding surface is kept in contact with the push member to keep the push member at the locked position, contact points or contact surfaces of the holding surface and the push member and the virtual axis of the rotating shaft are located on the same longitudinal line.

8. The electrical connector according to claim 2, wherein the plurality of first bulges are distributed at different axial positions of the rotating shaft along an axial direction of the rotating shaft.

9. An electrical connector, used for being electrically connected to another matched connector, the electrical connector comprising a flat housing, a locking mechanism, and an actuating component, wherein at least one electrical connection point electrically connected to another connector is received in the housing;

the locking mechanism moves to a locked position or a released position relative to the housing; at the locked position, the housing is fixed relative to another connector; at the released position, the housing is able to be separated from the another connector;

the actuating component comprises a rotating shaft and a handle; the handle is connected to the rotating shaft to drive the rotating shaft to rotate; a surface swept by the rotation of the handle is parallel to a virtual flat extending surface of the housing; the rotating shaft has an actuating structure; and the actuating structure is used for making the locking mechanism at the locked position or the released position;

wherein the locking mechanism comprises a push member; the push member is pushed by the actuating structure to move along a front-back longitudinal direction; the rotating shaft is perpendicular to the virtual flat extending surface; a virtual axis of the rotating shaft is located on one transverse side of a virtual longitudinal central line of the push member; and the actuating structure extends towards the other side direction of the virtual longitudinal central line of the push member.

10. The electrical connector according to claim 9, wherein the actuating structure comprises a plurality of first bulges; the first bulges are arranged forward at intervals in sequence along a preset rotation direction; when the rotating shaft rotates towards the preset rotation direction, the plurality of first bulges respectively push the push member such that the push member moves towards the locked position; the first bulge at the foremost end of the preset direction has a holding surface; and the holding surface is kept in contact with the push member to keep the push member at the locked position.

11. The electrical connector according to claim 10, wherein the push member comprises a plurality of first abutting surfaces and one second abutting surface; the plurality of first abutting surfaces are used for abutting against the corresponding first bulges respectively; the first abutting surface abutting against the foremost first bulge is connected to the second abutting surface; and the second abutting surface is kept abutting against the holding surface.

12. The electrical connector according to claim 11, wherein the first abutting surface abutting against the foremost first bulge is an inclined surface; and the inclined surface is inclined in a manner of being gradually away from the virtual axis towards the locked position.

* * * * *